US009942201B1

(12) United States Patent
Olofsson et al.

(10) Patent No.: US 9,942,201 B1
(45) Date of Patent: Apr. 10, 2018

(54) CONTEXT SPECIFIC KEYS

(71) Applicant: vIPtela Inc., San Jose, CA (US)

(72) Inventors: Lars Olof Stefan Olofsson, Dubai (AE); Atif Khan, San Jose, CA (US); Syed Khalid Raza, Fremont, CA (US); Himanshu H. Shah, Milpitas, CA (US); Amir Khan, San Jose, CA (US); Nehal Bhau, San Jose, CA (US)

(*) Notice: Subject to any disclaimer, the term of this patent is extended or adjusted under 35 U.S.C. 154(b) by 162 days.

(21) Appl. No.: 14/972,029

(22) Filed: Dec. 16, 2015

(51) Int. Cl.
*H04L 29/06* (2006.01)
*H04L 12/46* (2006.01)
*H04L 29/08* (2006.01)
*H04L 12/741* (2013.01)
*H04L 9/08* (2006.01)

(52) U.S. Cl.
CPC ........ *H04L 63/0272* (2013.01); *H04L 9/0819* (2013.01); *H04L 12/4641* (2013.01); *H04L 45/745* (2013.01); *H04L 67/327* (2013.01); *H04L 2209/24* (2013.01)

(58) Field of Classification Search
CPC .................................................. H04L 63/0272
See application file for complete search history.

(56) References Cited

U.S. PATENT DOCUMENTS

| | | | | |
|---|---|---|---|---|
| 6,055,575 A * | 4/2000 | Paulsen | ................... | H04L 29/06 709/226 |
| 6,092,200 A * | 7/2000 | Muniyappa | ......... | H04L 63/0272 713/100 |
| 7,957,991 B2 * | 6/2011 | Mikurak | ................ | G06Q 10/06 705/7.11 |
| 8,407,240 B2 * | 3/2013 | Denton | ............... | G06F 21/6218 707/766 |
| 8,671,176 B1 * | 3/2014 | Kharitonov | ............. | H04L 45/02 709/219 |
| 9,571,387 B1 * | 2/2017 | Atlas | ....................... | H04L 45/50 |
| 2003/0191937 A1 * | 10/2003 | Balissat | ............. | H04L 63/0272 713/163 |
| 2005/0177749 A1 * | 8/2005 | Ovadia | ............... | H04J 14/0227 726/5 |
| 2007/0058638 A1 * | 3/2007 | Guichard | ............ | H04L 12/4641 370/395.31 |
| 2009/0135848 A1 * | 5/2009 | Chan | ....................... | H04B 3/58 370/464 |
| 2010/0034207 A1 * | 2/2010 | McGrew | ................. | H04L 45/50 370/401 |
| 2010/0188975 A1 * | 7/2010 | Raleigh | ............ | G06Q 10/06375 370/230.1 |
| 2012/0079113 A1 * | 3/2012 | Zhu | ..................... | H04L 63/0272 709/225 |
| 2012/0214441 A1 * | 8/2012 | Raleigh | ............ | G06Q 10/06375 455/406 |
| 2014/0112347 A1 * | 4/2014 | Gargett | ............... | H04L 12/4641 370/395.53 |
| 2014/0226820 A1 * | 8/2014 | Chopra | ............... | H04L 63/0485 380/277 |

(Continued)

*Primary Examiner* — Ali Shayanfar
(74) *Attorney, Agent, or Firm* — Maschoff Brennan

(57) ABSTRACT

A method for operating a network is provided. The method comprises segmenting the network into a plurality of virtual private networks, wherein each virtual private network runs on an underlying physical network; and wherein each virtual private network represents a particular context; and configuring at least some nodes within the network to send and receive traffic based on context.

19 Claims, 13 Drawing Sheets

(56) References Cited

U.S. PATENT DOCUMENTS

| | | | |
|---|---|---|---|
| 2014/0349614 A1* | 11/2014 | Starsinic | H04L 63/0876 |
| | | | 455/411 |
| 2016/0173338 A1* | 6/2016 | Wolting | H04L 41/145 |
| | | | 709/223 |
| 2016/0191374 A1* | 6/2016 | Singh | H04L 41/00 |
| | | | 370/228 |
| 2017/0026417 A1* | 1/2017 | Ermagan | H04L 12/4641 |
| 2017/0331789 A1* | 11/2017 | Kumar | H04L 63/0272 |

* cited by examiner

CONTEXT SPECIFIC KEYS

FIELD

Embodiments of the present invention relate to networking.

BACKGROUND

Encryption of network traffic relies on the reliable assignment and distribution of keys for which there exists a variety of protocols. The most well-known and used of these protocols are IKE (IETF RFC 2409) and IKEv2 (IETF RFC5996). Both IKE and IKEv2 operate by creating Security Associations (SA) for the establishment of encryption relationships between nodes and the exchange of keys, Security Parameter Index (SPI) for indication of what particular SA to use for decryption of received traffic, and Traffic Selectors (TS) for deciding which SA, if any, in a given node to use when encrypting outgoing traffic. This type of architecture works well for most applications, but is challenged if the exchange of encrypted traffic between nodes is to be based on other characteristics than source and destination IP-addresses and transport-layer ports.

The architecture provided by IKE together with IPsec (IETF RFC 4301) is widely deployed and well understood in the networking industry, where it largely serves as a means of providing encrypted traffic between network-layer endpoints, potentially extending to transport layer ports. This architecture provides for a common transport fabric where encryption capabilities are defined on a basis of per pair of endpoints. IPsec also has extensions that allow for a group of nodes to share a common encryption architecture, and even keys. This is referred to as a Group Domain of Interpretation (IETF RFC 3547). In a GDOI, group keys are defined and are then shared among a group of authenticated nodes for the creation of a larger set (>2) of nodes that share encryption attributes for enablement of secured communication. The SAs defined in GDOI still employ the same style of granularity as previously mentioned in terms of matching traffic to an SA.

SUMMARY

Embodiments of the present invention disclose an encryption an encryption scheme that allows a contextual definition of security policies that is not specifically tied to endpoints identified on the basis of IP-addresses and transport-layer ports. Advantageously, an organization may segment a network into multiple Virtual Private Networks (VPNs), where each VPN may represent a unique application, a department, a specific topology or any other basis required by the organization. A VPN typically defines a virtual network topology that is overlaid on top of the underlying network.

Advantageously, specific security requirements may be defined on a per-VPN basis. Thus, VPNs may be segmented on the basis of particular security requirements. Additionally, specific software entities that run on particular hardware, e.g. common servers may be equipped with attributes related to security requirements. Such software entities may be virtual machines (VMs) or even individual software processes (aka daemons).

According to one aspect of the invention, a node of a network may have multiple contexts, wherein each context is assigned individual and specific encryption keys. According to another aspect of the invention, context specific encryption keys may be restricted to be used with a uniquely identified context According to another aspect of the invention, a context may be identified from information contained in the non-encrypted portion of an encrypted packet.

According to another of the invention, there is provided the ability to choose whether or not to manage and store encryption keys in a single database or context specific databases.

According to another aspect of the invention, a context may be defined on the basis of local configuration of VPN-instances, Virtual Machines, Software Processes, VLANs or other elements of virtualization that may be in use by a node also providing networking services According to another aspect of the invention, a node may have an ability to decide on a per context and encryption peer basis whether or not to use unidirectional or pair-wise encryption keys According to another aspect of the invention, encryption keys may be carried in a common control plane protocol indicating the context for which each encryption key is applicable and also for which encryption peers unidirectional or pair-wise keys will be applied and which specific keys are assigned to which peers in the case of pair-wise keys.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the Invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the invention disclose a method for assigning encryption keys to nodes of a network on the basis of context.

Figure 1:
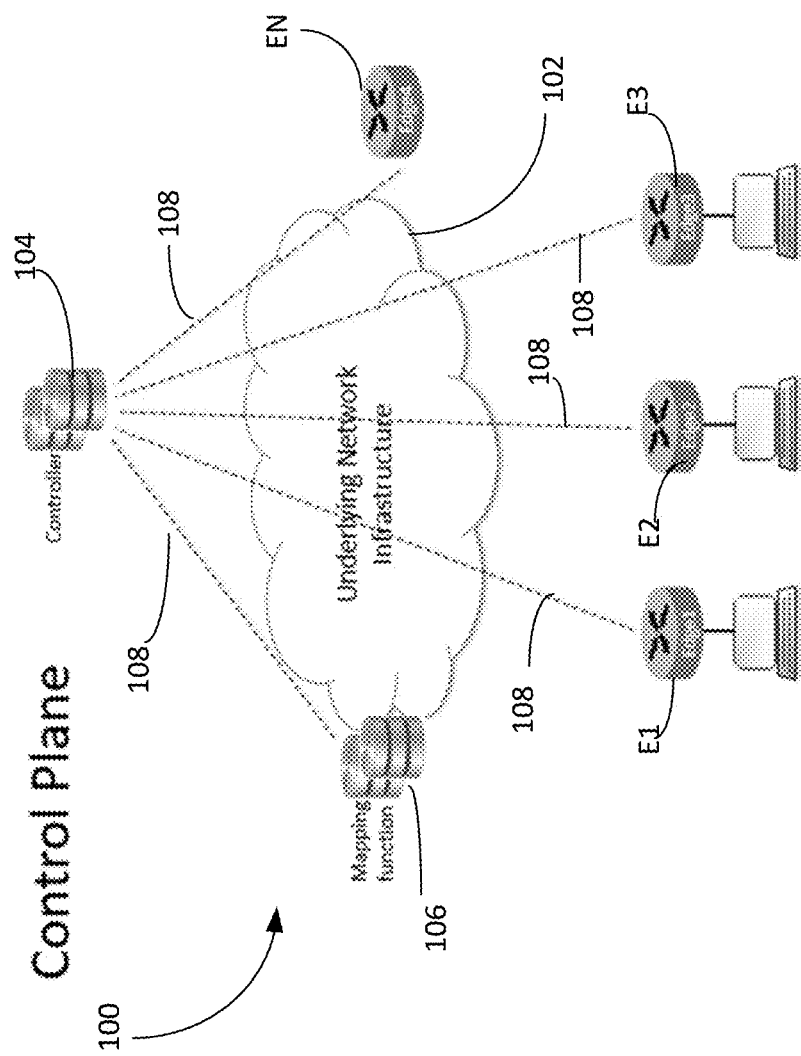
FIG. 1 shows a control plane for a network, in accordance with one embodiment of the invention.
Figure 2:
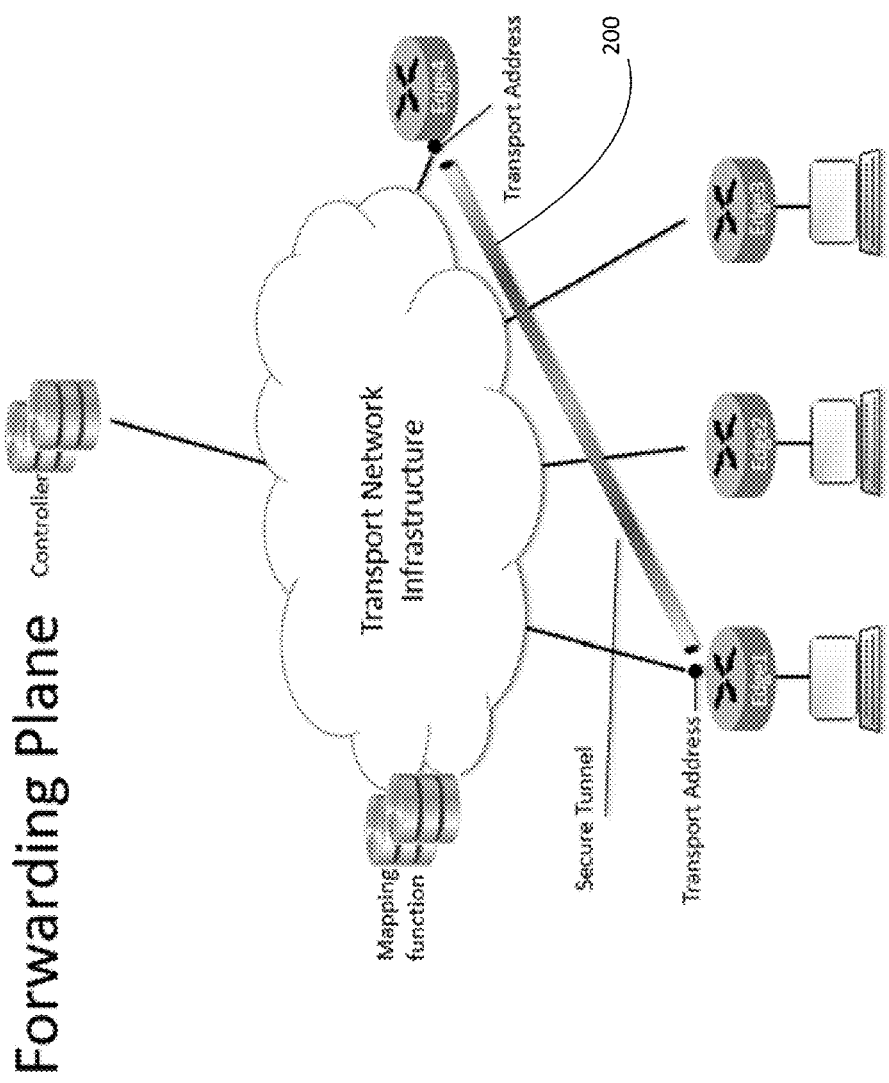
FIG. 2 shows a forwarding plane for the network, in accordance with one embodiment of the invention.

FIGS. 1 and 2 illustrate aspects of a representative software-network 100 in accordance with one embodiment of the invention. In particular, FIG. 1 illustrates a control plane for the network 100, whereas FIG. 2 illustrates a forwarding plane for the network 100. Referring to FIG. 1, reference numeral 102 indicates underlying network infrastructure that may be used to connect endpoints/edges E1 to EN together. In one embodiment, the endpoints/edges may represent branch office routers. In FIG. 1 only four edges are shown and are indicated as edges E1 to E4, respectively. However, it is to be understood that many more edges are possible in accordance with different embodiments.

The underlying network infrastructure 102 may include elements that form a Wide Area Network (WAN) and in some embodiments may include public and/or private infrastructure. For example. In one embodiment the underlying network infrastructure 102 may include the public Internet.

In one embodiment, the network 100 may be configured to support a control plane, which is established to all endpoints in the network. Techniques for establishing the control plane are using an Overlay Management Protocol, are described in co-pending U.S. patent application Ser. No. 14/133,558 entitled "OVERLAY MANAGEMENT PROTOCOL FOR SECURE ROUTING BASED ON AN OVERLAY NETWORK" which is incorporated herein by reference in its entirety. The control plane serves as a distribution mechanism for context-specific encryption keys, as will be described later.

In one embodiment, to facilitate the establishment of said control plane, the network further comprises a controller 104 and a mapping server 106 that executes a mapping function. The mapping server 106 supports a bring up method used to establish the control plane as is described in co-pending U.S. patent application Ser. No. 14/028,518 entitled "SECURE BRING-UP OF NETWORK DEVICES" which is incorporated herein by reference in its entirety.

In one embodiment, the control plane is defined by secure control channels 108 between the controller 104 and the various edges in the network 100, and the between the controller 104 and the mapping server 106. In one embodiment, the channels 108 may comprise DTLS tunnels. In one embodiment, communications between the entities in the control plane occurs by means of a control plane protocol. By way of example, one such control plane protocol is described in co-pending U.S. patent application Ser. No. 14/133,558 entitled "OVERLAY MANAGEMENT PROTOCOL FOR SECURE ROUTING BASED ON AN OVERLAY NETWORK", which is incorporated herein by reference, in its entirety.

In one embodiment, the establishment of the control channels 108 may be in accordance with the techniques described in co-pending U.S. patent application Ser. No. 14/252,221 entitled "DISSEMINATION OF NAT TRAVERSAL ATTRIBUTES IN A CONTROL PLANE PROTOCOL", which is incorporated herein by reference, in its entirety.

Communications between the devices E1 to EN occurs via a forwarding or data plane connection between the devices. By way of example consider that the edge E1 is to establish a forwarding connection with the edge E4. This forwarding connection will be established as a secure tunnel 200 as indicated in FIG. 2 of the drawings.

In one embodiment, data plane may be established in accordance with the techniques described in U.S. patent application Ser. No. 14/146,683 entitled "BI-DIRECTIONAL NAT TRAVERSAL USING ENDPOINT ASSIGNED DISCRIMINATORS", which is incorporated herein by reference in its entirety.

Figure 3:
FIG. 3 shows an exemplary message format, in accordance with one embodiment of the invention.

In accordance with one embodiment of the invention, context-specific encryption keys may be carried using messages in a particular message format. FIG. 3, illustrates an exemplary message format 100, in accordance with one embodiment. The message format 100 includes the following fields:

Main Context-identifier: this field is divided into three components describing the type, length and value of the Originator. Type occupies one octet, length occupies one octet and value will occupy the number of octets as indicated in the length field. The length field must be a multiple of two, indicating a minimum length of the value field as 16 bits. A type of 0x0 would indicate no context specific encryption and thereby not require the following three fields (Sub Context Identifier, Context-type and Context-nature). A type of 0x1 indicates an IPv4-address; a type of 0x2 indicates an IPv6-address and other types will be added as needed.

Sub Context-identifier: this field is divided into three sub-fields describing the type, length and value of any required sub-context identification required for the Originator. Type occupies one octet, length occupies one octet and value will occupy the number of octets as indicated in the length field. The length field must be a multiple of two, indicating a minimum length of the value field as 16 bits. A type of 0x1 indicates a 16-bit upper layer protocol port-number and other types will be added as needed.

Context-type: an 8-bit identifier labeling the context as a VPN or another supported type. Will not be present if Context-Identifier is 0x0

Context-nature: an 8-bit identifier labeling the context as Point-to-Point, Mesh or another supported type. Will not be present if Context-Identifier is 0x0

Encryption-key-use: an 8-bit identifier labeling the distributed key to be used in a unidirectional, pair-wise or another supported fashion Encryption-key-target: a 8-bit identifier where the lower 4 bits specifies the target use for the distributed key to be context only for a unidirectional key and context with a remote endpoint for a pair-wise key. The upper 4 bits indicates if the remote endpoint is using a either 32-bit or 128-bit identifier specified in the following field.

Target-identifier: The remote endpoint for a pair-wise key. This field is divided into three components describing the type, length and value of the target. Type occupies one octet, length occupies one octet and value will occupy the number of octets as indicated in the length field. The length field must be a multiple of two, indicating a minimum length of the value field as 16 bits. A type of 0x0 would indicate no context specific encryption and thereby not require the following two fields. A type of 0x1 indicates an IPv4-address; a type of 0x2 indicates an IPv6-address and other types will be added as needed.

Sub Target-identifier: this field is divided into three subfields describing the type, length and value of any required sub-context identification required for the Originator. Type occupies one octet, length occupies one octet and value will occupy the number of octets as indicated in the length field. The length field must be a multiple of two, indicating a minimum length of the value field as 16 bits. A type of 0x1 indicates a 16-bit upper layer protocol port-number and other types will be added as needed.

Encryption-flags: This 16-bit field carries information on the Message-integrity-check to be used as either SHA-1 or other hash algorithm. It also carries information on the Encryption-algorithm to be used as either AES or other encryption algorithm Encryption-key-length: 16-bit number SPI: a 32-bit number used to link the incoming packets to a decryption context defined on the receiving endpoint. This field is part of IPsec ESP as defined in IETF RFC4303.

Context Specific Encryption Keys in Operation

In one embodiment, each node in the network 100 may be configured to process traffic based on context-specific encryption keys. As part of said configuration, the node may be directed, either by policy or configuration, to generate keys based on certain criteria. In one embodiment, said policy may be obtained from the controller 104. For example, for locally configured VPNs the node may be configured to allocate global unidirectional keys, global pair-wise keys, context-specific unidirectional keys or context-specific pair-wise keys. For other local virtualized resources (VMs, VLANs etc.) the node may be configured to generate keys from one of the same groups defined for VPNs above.

Figure 4:
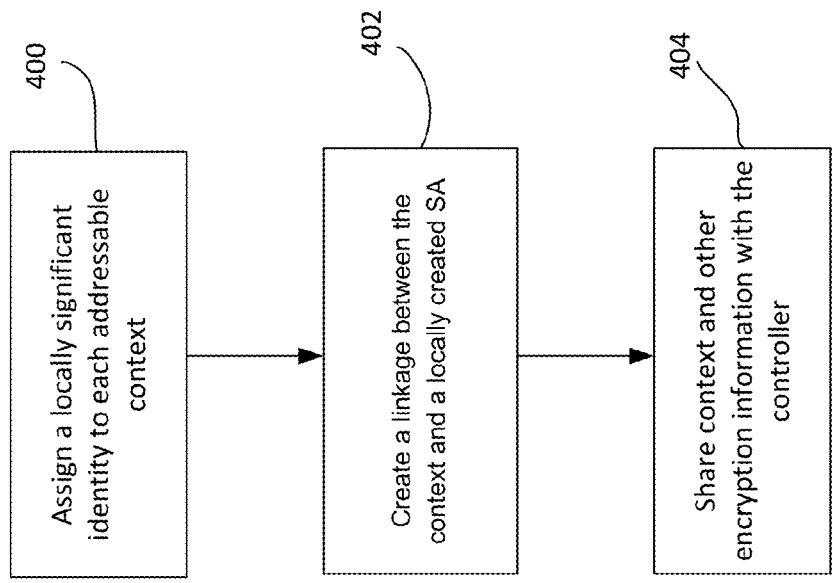
FIG. 4 shows a flowchart of operations performed by a node to enable context-specific encryption keys.

For example, FIG. 4 of the drawings shows a flowchart of operations performed by each node to enable context-specific encryption keys. Referring to FIG. 4, each node assigns a locally significant identity to each addressable context. This step is indicated at block 300. At block 402, a linkage is created between the context and a locally created SA to be used for assigning the SPI that is advertised with the other encryption information (keys, context, SPI) to the remote peers with which encrypted communication is to take place.

Nodes participating in a common encryption domain may be configured to use a common scheme for identifying different contexts and the type of a given context. The type of a given context allows for establishing whether or not the context is simply an endpoint-to-endpoint session or a larger construct, such as a VPN or other logical domain for which a common encryption policy should be administered.

At block 404, each node shares its context and other encryption information with the controller 104 using the common control plane protocol. Each node also receives context and encryption information for remote endpoints from the controller 104 via the control plane protocol.

At this point, a node can establish encrypted communication channels with other endpoints. This is not performed using IKE or IKEv2, as all the required information for establishing such a channel already has been shared. It is assumed that once all the required information has been received, that intended recipients of encrypted data also has received the corresponding information as originated by the local node. In one embodiment, in the forwarding process, for receiving unencrypted data intended for forwarding using an encrypted channel, the originating node may be configured to track the originating context of the data while also utilizing the encryption-specific attributes associated with that context and the intended receiver. Thus, in one embodiment, the originating node may maintain a local database that allows for a lookup and extraction of the required elements. These include, but are not be limited to:

Originating Context

Destination Context

Encryption attributes (e.g. destination SA)

Encapsulation attributes (e.g. destination SPI)

Outgoing interface

Figure 5:
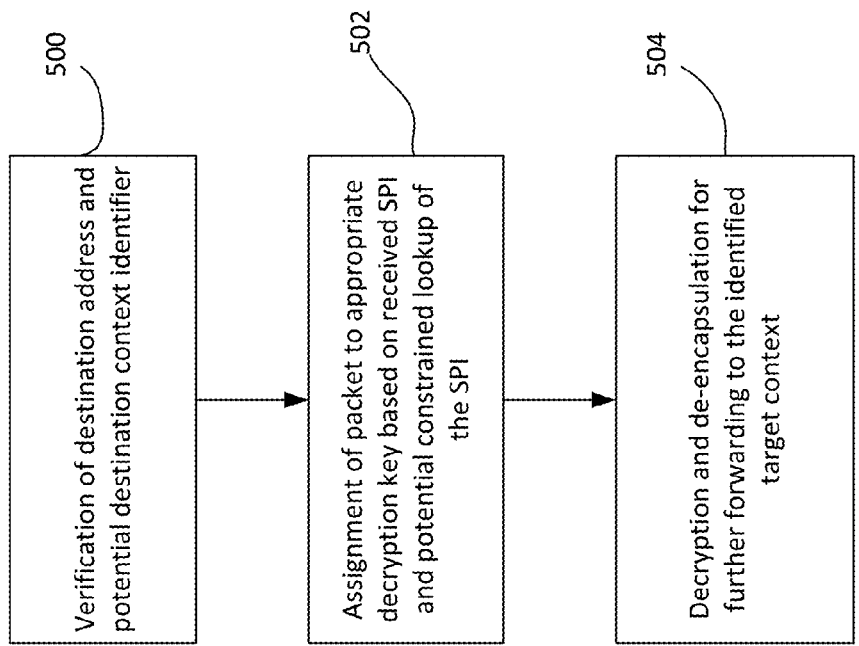
FIG. 5 shows a flowchart of operations performed by a receiving node, in accordance with one embodiment of the invention.

Referring now to FIG. 5 of the drawings, there is shown a flowchart of operations performed by a node receiving encrypted traffic, in accordance with one embodiment of the invention. When a node is on the receiving end of an encrypted channel, a reverse process occurs for successful decryption of the traffic and further forwarding of the unencrypted packets to the designated target context. When a packet is received on an encrypted channel, the following occurs:

step 500: verification of the destination address and potential destination context identifier (which may be the destination IP-address, the SPI, or another item in the encapsulating header that allows for the unique identification of a context on the receiving node);

step 502: assignment of the packet to the appropriate decryption key based on the received SPI and potential constrained lookup of the SPI to an indicated context table of SPI entries depending on information carried in the packet and attribute exchanged as part of the control plane protocol communications;

step 504: decryption and de-encapsulation for further forwarding to the identified target context.

To properly illustrate the process at a receiving node, an example of how a contextual decryption would take place is provided below.

Encrypted Overlay Tunnels

In this scenario, a set of nodes is configured to communicate in the network 100 where the means of carrying user-information consists of encrypted tunnels between endpoints defined by a tuple of information including the Source IP-address, Source Upper Layer Port, Destination IP-address and Destination Upper Layer Port. The actual pointer used to lookup decryption information is carried in the ESP SPI field (IETF RFC4303). The context may be defined by two endpoints sharing a set of information, in this example any common VPNs, which defines a set of possible encryption as the ones applicable to the VPNs in question. While other endpoints in the network may also partake in the same VPNs, the subset is common to only the two nodes for which any given session packet is processed.

As an example, when packets are processed the following lookup and processing sequence pertaining to encryption may be executed:

(a) Source IP-address, Source Upper Layer Port, Destination IP-address and Destination Upper Layer Port is looked up in the incoming packet and hashed into a context-ID;

(b) the context table is consulted to determine if the context-ID Is present and if so, a list of SPIs valid for the context is retrieved (c) the SPI from the packet is compared to the retrieved SPI list to determine if it's valid for the determined context; and (d) if the received SPI is valid the key is retrieved and used to decrypt the packet, else if the SPI is invalid for the context the packet is dropped.

The above example uses information that normally exists in packets encapsulated in ESP. However, it is to be understood that any encapsulation that were to provide a context specific pointer is may be used. For example, an MPLS label could be carried in the unencrypted portion of a packet to indicate a context within the SPI carried in the packet should exist for decryption to be properly processed.

In one embodiment, a catchall procedure may be provided where certain SPI-values can be made applicable to a global context for use as general decryption hooks in case a global context exists or the receiving node employs functions to deal with traffic not mapped to a specific context for statistics and analytics or other applications.

Policy Configuration

In one embodiment, either locally or centrally defined policies are used to determine what style of encryption will be enforced on a per context basis. A likely default configuration of a node supporting context-specific encryption is to provide a common encryption policy across all contexts, as something must dictate how each local context relates to other contexts in the encryption domain. In a control-plane environment where nodes are controlled through a centralized common control-plane it is likely that domain-wide policies are distributed from a central controller. This approach does not exclude either supplemental local policy configuration or local policy configuration as an only mean of policy enforcement. Either model can be used in an equally effective manner in terms of defining context-specific encryption attributes, whereas a centralized model can claim operational benefits of scale and efficiency.

Exemplary Context Definition

Figure 6:
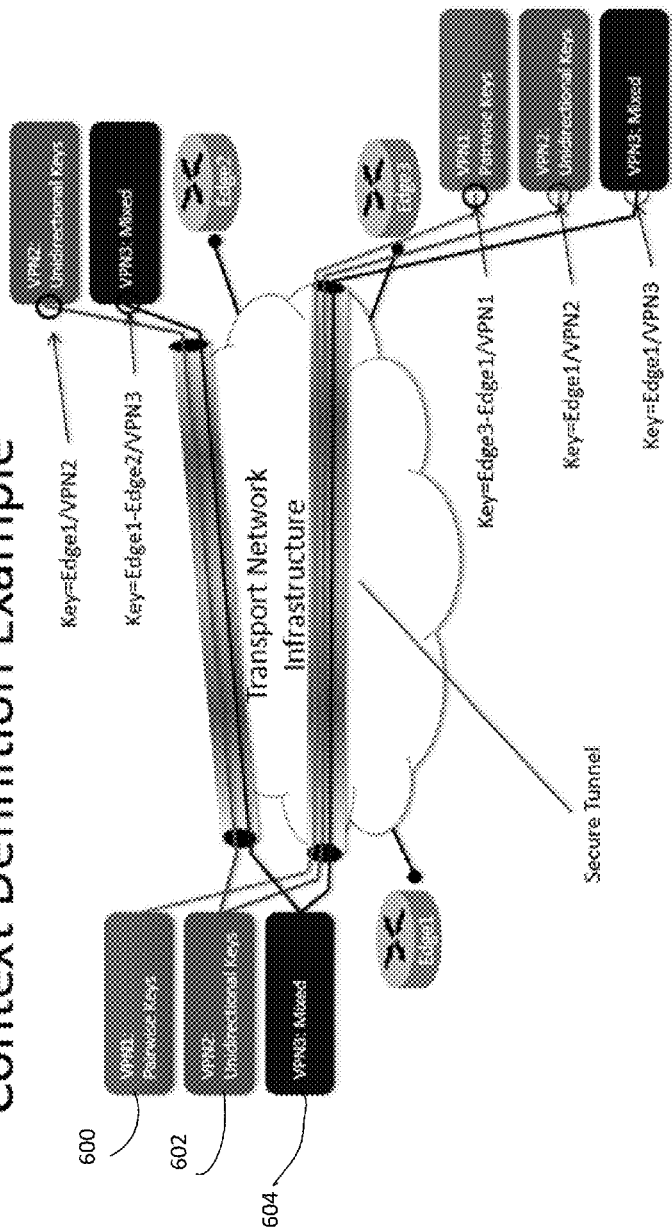
FIG. 6 shows an example of a context definition configured in a VPN basis, in accordance with one embodiment of the invention.

Referring now to FIG. 6 of the drawings, there is shown an example of the context definition configured on a VPN basis. In FIG. 5, nodes E1, E2, and E3 support three VPN contexts indicated as VPN 1, VPN 2, and VPN 3. As will be seen, VPN 1 supports pairwise keys, VPN 2 supports unidirectional keys, and VPN 3 supports mixed keys. In terms of the context definition, traffic between E1 and E2 on VPN 2 will be encrypted based on unidirectional keys provided by E1 and E2. Traffic between E1 and E2 on VPN 3 may be encrypted using pair-wise keys generated by E1, and E2, respectively. Thus, traffic bound from E1 to E2 on VPN 3 will be encrypted using a pairwise key generated by E2, whereas traffic on VPN 3 from E2 to E1 will be encrypted using a pairwise key generated by E1.

For traffic between E1 and E3 on VPN 1, packets will be encrypted using pairwise keys generated by E3, and E1, respectively. For VPN 2, traffic between E1 and E3 will be encrypted using unidirectional keys generated by E1 and E3, and for VPN 3, packets between E1 and E3 will be encrypted based on unidirectional keys generated by E1 and E3. The keys used at E1 and E3 are common across VPN 2 and VPN 3.

Assuming that the node E1 is configured to originate traffic towards nodes E2, and E3, then in accordance with the techniques disclosed herein, the node E1 will be provisioned with context SPI tables. As will be seen, E1 has a table 600 corresponding to VPN 1, table 602 corresponding to VPN 2, and table 604 corresponding to VPN 3. Similarly, other nodes in the network will be provisioned with context tables.

Figure 7:
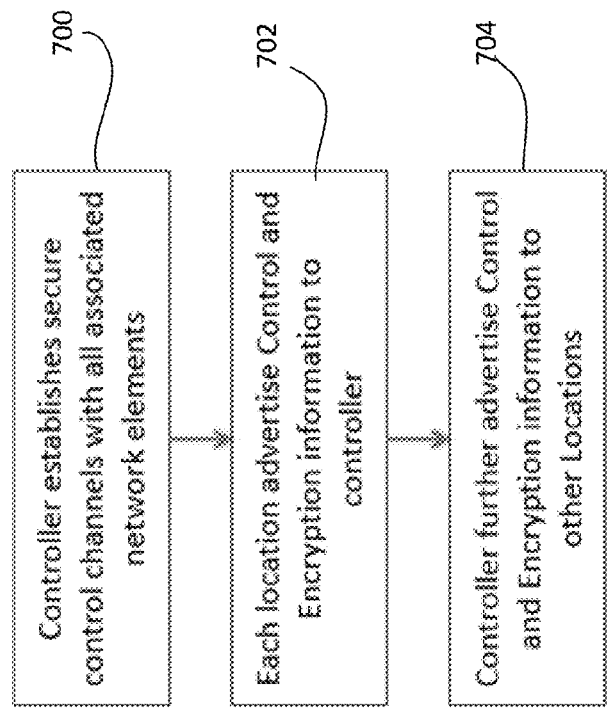
FIG. 7 shows operations performed to configure a node with context tables, in accordance with one embodiment of the invention.

FIG. 7, shows operations performed to configure the nodes with the context tables, in accordance with one embodiment of the invention. Referring to FIG. 7, at block 700, the controller 104 establishes secure control channels with all associated network elements. At block 702, each location advertises control and encryption information to the controller 104, as previously described. Finally, at block 704, the controller 104 for the advertises control and encryption information to other locations ((that is all other nodes).

Figure 8:
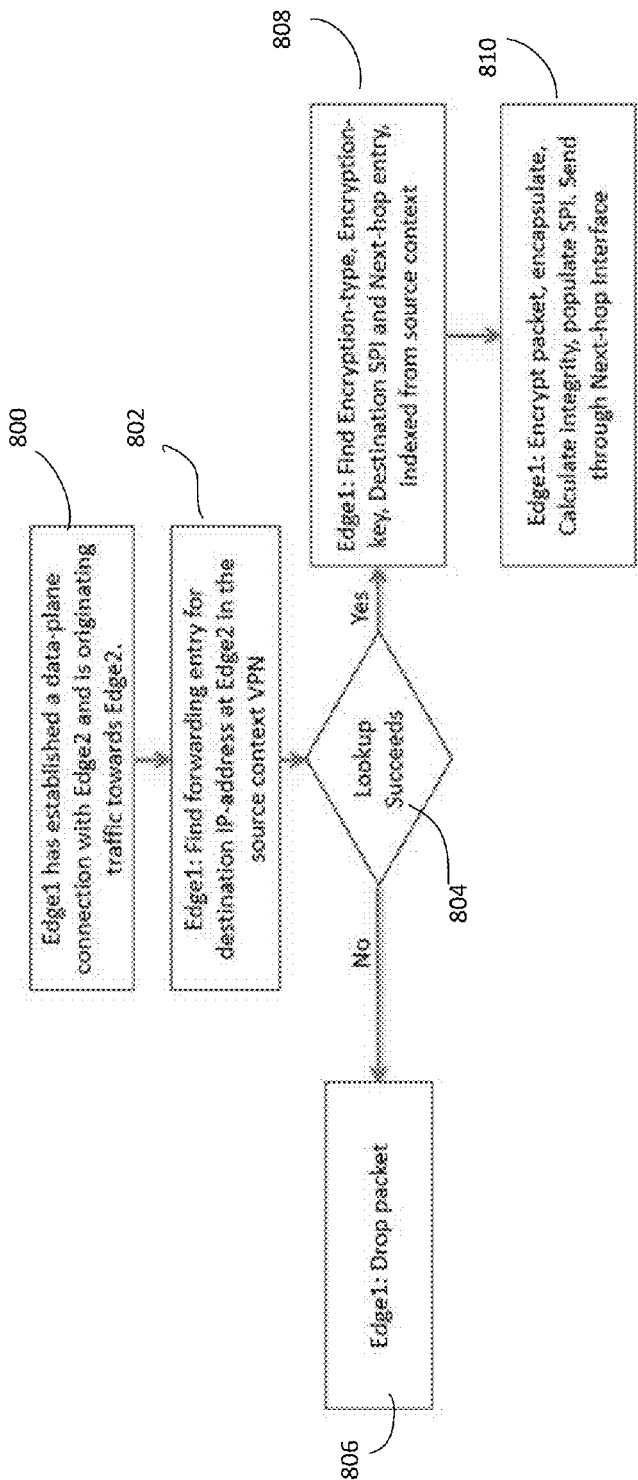
FIG. 8 shows a flowchart about operations performed by an originating node when forwarding packets based on context, in accordance with one embodiment of the invention.
Figure 9:
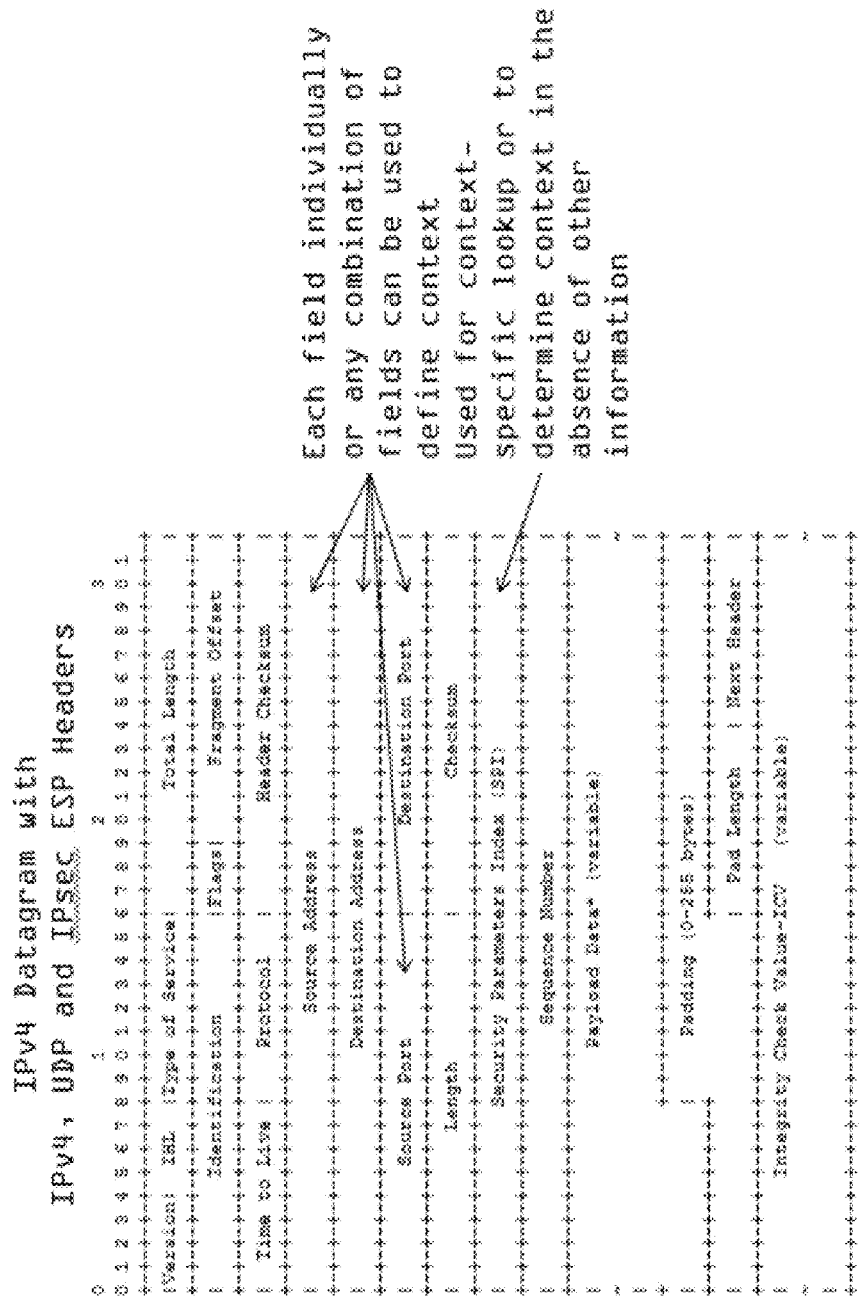
FIG. 9 shows the fields of an IPv4 datagram that may be used to carry context information, in accordance with one embodiment of the invention.

Referring now to FIG. 8 of the drawings, there is shown a flowchart of operations performed by an originating node when forwarding packets based on context, within the network, in accordance with one embodiment of the invention. For purposes of illustration, the originating node is deemed to be node E1 and the destination node is assumed to be node E2. As will be seen, at block 800, E1 has established a data-plane connection with node E2 and Is originating traffic to its E2. Blocks 802 to 810 are performed for each packet originated by E1 to its E2. At block 802, node E1 executes a process (lookup) to find a forwarding entry for the destination IP address of edge E2. The destination IP address may be found in a source context VPN. At block 804, if said on lookup fails then control process to block 806 where node E1 drops the packet. Alternatively, if said lookup succeeds then block 808 executes rate in node E1 finds: the encryption type, the encryption key, the destination SPI, and the next-hop entry based on the source context Thereafter, control passes to block 810, wherein node E1 encryption encapsulates the packet, calculates integrity, populates SPI, and sends said packet to the next-hop interface. In one embodiment, fields within a datagram packet may be used to carry information about a context. FIG. 9 shows that particular field of an IPv4 datagram that may be used to carry context information, in accordance with one embodiment of the invention.

Figure 10:
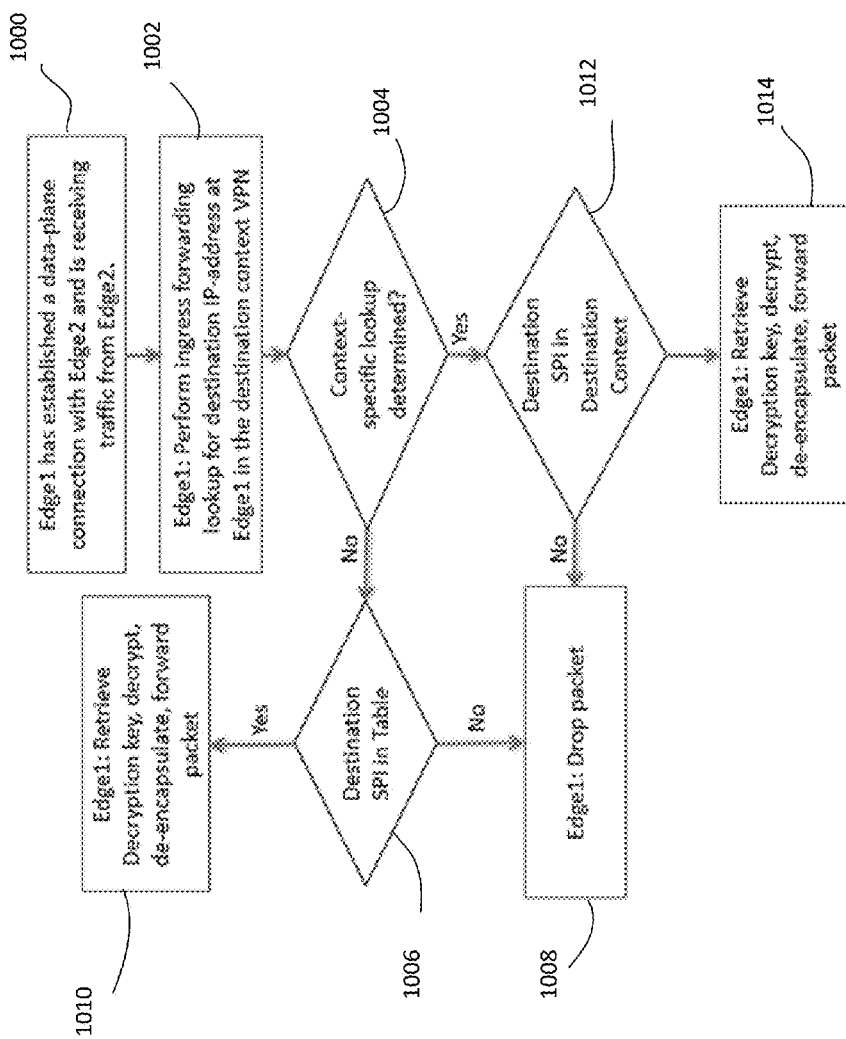
FIG. 10 illustrates the processing steps performed by a node receiving context specific traffic, in accordance with one embodiment of the invention.

FIG. 10 illustrates the processing steps performed by a node receiving context specific traffic, in accordance with one embodiment of the invention. In the case of FIG. 10, the receiving node corresponds to edge E1. Referring to FIG. 10, at block 1000, the edge E1 has established a data-plane connection with the edge E2 and is receiving traffic from E2. Blocks 1002 to 1014 are performed for each received packet. Corresponding to the block 1002, edge E1 performs and Ingress forwarding lookup operation to find the destination IP address corresponding to a received packet. The lookup is performed in a destination context VPN stored in a context table at edge E1. At block 1004, if said lookup falls then block 1006 executes corresponding to the case where there is no context associated with the destination IP address. At block 1006, a second lookup is performed in order to determine if the destination IP address has an associated SPI known to the node E1. If the second lookup fails, then the packet is dropped by edge E1, at block 1008. Otherwise, block 1110 executes, wherein edge E1 retrieves a decryption key, and decrypts, de-encapsulates, and forwards the packet.

Figure 11:
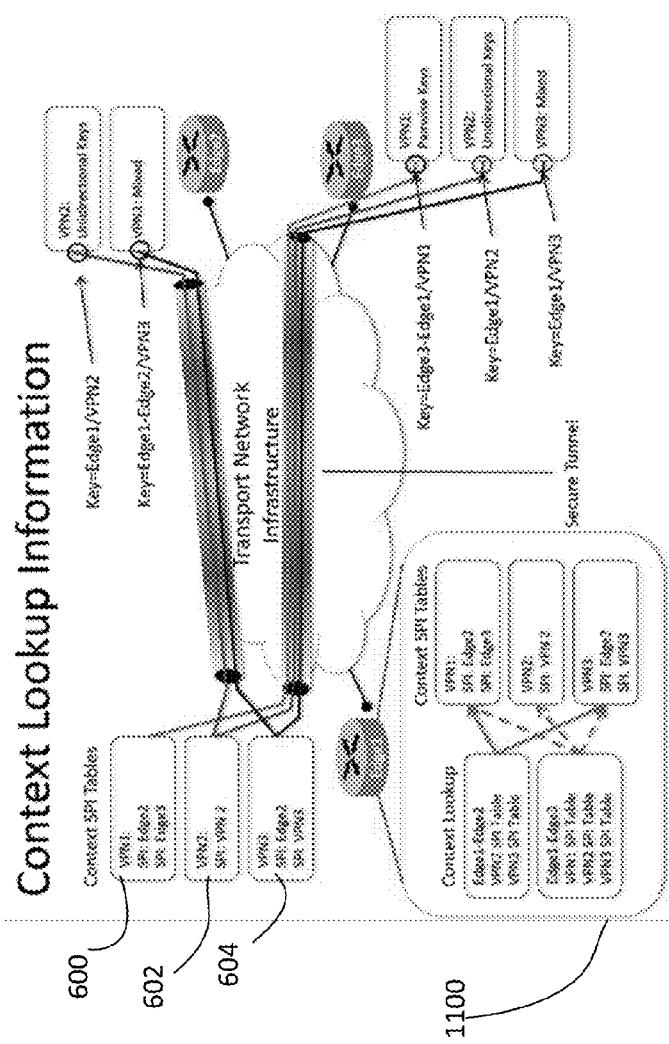
FIG. 11 shows the lookup context information for a node, in accordance with one embodiment of the invention.

FIG. 11 shows the context lookup information pertaining to the example just described. In FIG. 11, the context lookup and context SPI tables are indicated by reference numeral 1100.

Figure 12:
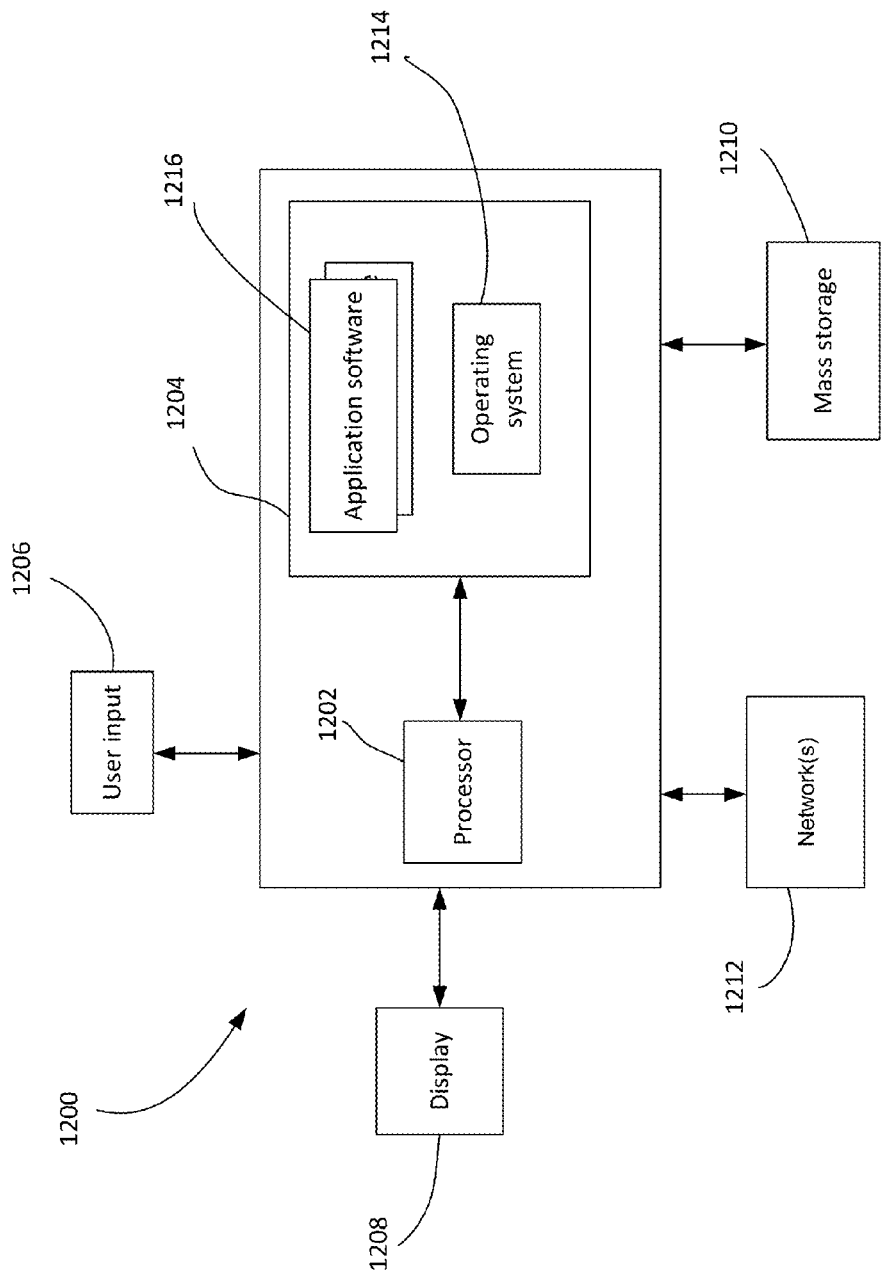
FIG. 12 shows an example of hardware that may be used to implement a controller, in accordance with one embodiment of the invention.

FIG. 12 shows an example of hardware 1200 that may be used to implement the controller 104, in accordance with one embodiment. The hardware 1200 may include at least one processor 1202 coupled to a memory 1204. The processor 1203 may represent one or more processors (e.g., microprocessors), and the memory 1204 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 1204 may be considered to include memory storage physically located elsewhere in the hardware, e.g. any cache memory in the processor 1202, as well as any storage capacity used as a virtual memory, e.g., as stored on a mass storage device.

The hardware also typically receives a number of inputs and outputs for communicating information externally. For Interface with a user or operator, the hardware may include one or more user Input output devices 1026 (e.g., a keyboard, mouse, etc.) and a display 1208. For additional storage, the hardware 1000 may also include one or more mass storage devices 1010, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 1212 (e.g., a local area network (LAN), a wide area network (WAN), a wireless network, and/or the Internet among others) to permit the communication of information with other computers coupled to the networks. It should be appreciated that the hardware typically Includes suitable analog and/or digital interfaces between the processor 1012 and each of the components, as is well known in the art. The hardware 1200 operates under the control of an operating system 1214, and executes application software 1216 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 13:
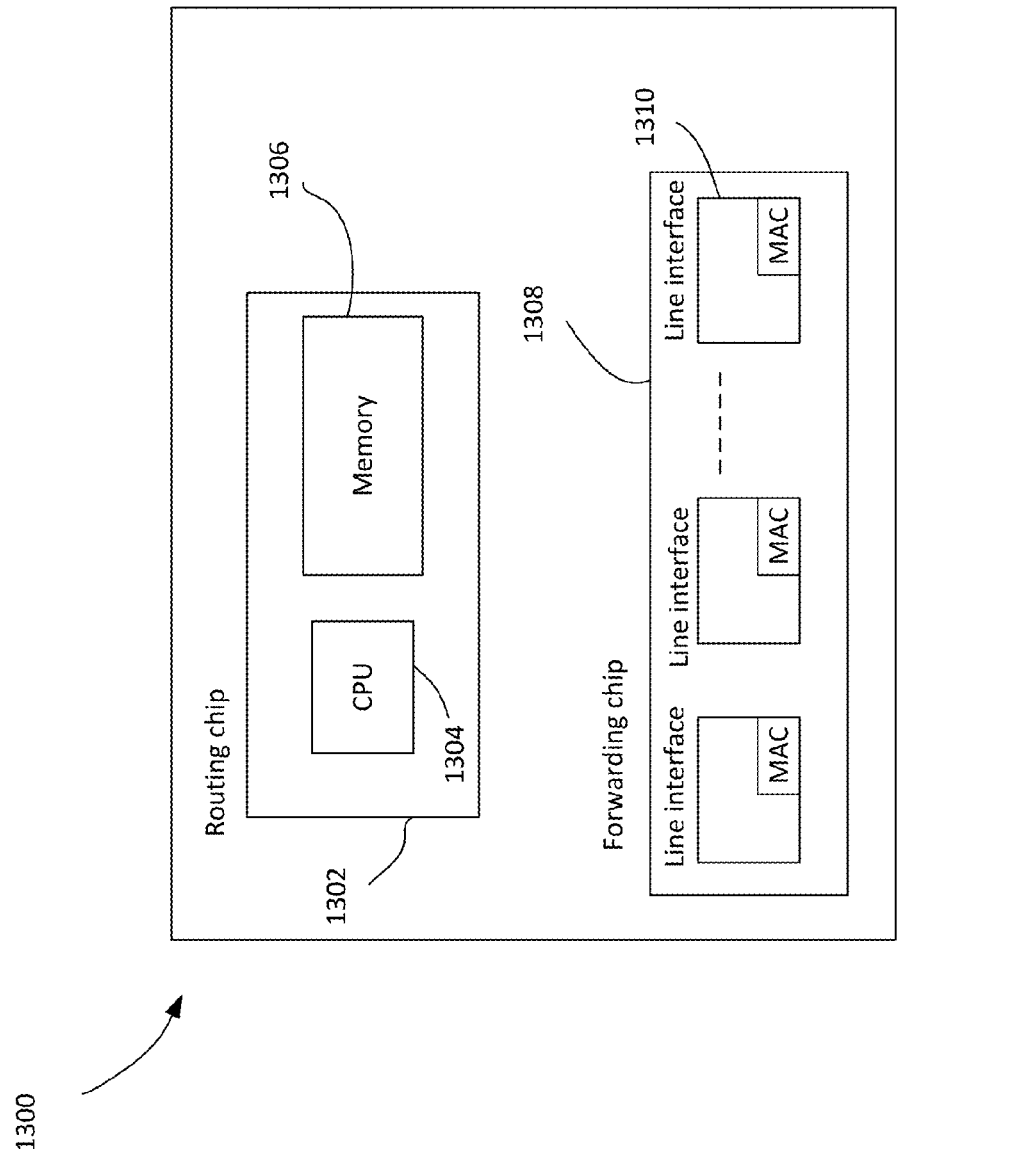
FIG. 13 shows a block diagram of hardware for an edge router or node, in accordance with one embodiment of the invention.

FIG. 13 shows a block diagram of hardware 1300 for edge routers and hubs describe above, in accordance with one embodiment of the invention. Referring to FIG. 13, the hardware 1300 includes a routing chip 1304 coupled to a forwarding chip 1308. The routing chip 1304 performs functions such as path computations, routing table maintenance, and reachability propagation. Components of the routing chip include a CPU or processor 1304, which is coupled to a memory 1306. The memory stores Instructions to perform the methods disclosed herein. The forwarding chip is responsible for packet forwarding along a plurality of line interfaces 1310.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for operating a network, comprising:
segmenting the network into a plurality of virtual private networks, wherein each virtual private network runs on an underlying physical network, and wherein each virtual private network represents a particular context; and
configuring a node within the network to send and receive traffic based on context, comprising:
receiving a first encryption key associated with a first virtual private network of the plurality of virtual private networks from the node after the node generates the first encryption key;
receiving a second encryption key associated with a second virtual private network of the plurality of virtual private networks from the given node of the at least some nodes that generated the second encryption key, the second encryption key different from the first encryption key; and
communicating the first and the second encryption keys to a node in the network different from the given node.

2. The method of claim 1, wherein each context is selected from a group consisting of an application, a department, and a specific topology.

3. The method of claim 1, wherein the network is operated based on a control plane and a forwarding plane.

4. The method of claim 3, wherein configuration of a context is based on one or more policies distributed to individual endpoints in the network by a controller for the control plane.

5. The method of claim 4, wherein each endpoint comprises multiple contexts.

6. The method of claim 1, when the first and the second encryption keys are distributed to other nodes in the network using the control plane.

7. The method of claim 1, wherein configuring the node comprises configuring the node to perform an egress forwarding operation wherein only a packet for which there is a destination IP address associated with a source context identified in the packet is forwarded.

8. The method of claim 7, wherein configuring the node comprises configuring the node to perform an ingress forwarding operation wherein only a packet for which there is a destination 1P address associated with a destination context identified in the packet is forwarded.

9. The method of claim 8, wherein the source context and destination context are stored locally within each edge node in the network.

10. One or more non-transitory computer-readable media containing instructions which, in response to being executed by one or more processors, cause a system to perform operations comprising:
- segment the network into a plurality of virtual private networks, wherein each virtual private network runs on an underlying physical network, and wherein each virtual private network represents a particular context; and
- configure a node within the network to send and receive traffic based on context, comprising:
  - receive a first encryption key associated with a first virtual private network of the plurality of virtual private networks from the node after the node generates the first encryption key;
  - receive a second encryption key associated with a second virtual private network of the plurality of virtual private networks from the given node of the at least some nodes that generated the second encryption key, the second encryption key different from the first encryption key; and
  - communicate the first and the second encryption keys to a node in the network different from the given node.

11. The computer-readable media of claim 10, wherein each context is selected from a group consisting of an application, a department, and a specific topology.

12. The computer-readable media of claim 10, wherein the network is operated based on a control plane and a forwarding plane.

13. The computer-readable media of claim 12, wherein configuration of a context is based on one or more policies distributed to individual endpoints in the network by a controller for the control plane.

14. The computer-readable media of claim 13, wherein each endpoint comprises multiple contexts.

15. The computer-readable media of claim 10, when the first and the second encryption keys are distributed to other nodes in the network using the control plane.

16. The computer-readable media of claim 10, wherein configuring the node comprises configuring the node to perform an egress forwarding operation wherein only a packet for which there is a destination IP address associated with a source context identified in the packet is forwarded.

17. The computer-readable media of claim 16, wherein configuring the node comprises configuring the node to perform an ingress forwarding operation wherein only a packet for which there is a destination 1P address associated with a destination context identified in the packet is forwarded.

18. The computer-readable media of claim 17, wherein the source context and the destination context are stored locally within a given edge node in the network.

19. A system comprising:
- a node in a network, the node configured to communicate with a first virtual private network and a second virtual private network; and
- a control device configured to perform operations, the operations comprising:
  - segment the network into the first and second virtual private networks, wherein each virtual private network runs on an underlying physical network, and wherein each virtual private network represents a particular context; and
  - configure the node to send and receive traffic based on context, comprising:
    - receive a first encryption key associated with the first virtual private network from the node after the node generates the first encryption key;
    - receive a second encryption key associated with the second virtual private network from the node after the node generates the second encryption key, the second encryption key different from the first encryption key; and
    - communicating the first and the second encryption keys to a node in the network different from the given node.

* * * * *